UNITED STATES PATENT OFFICE.

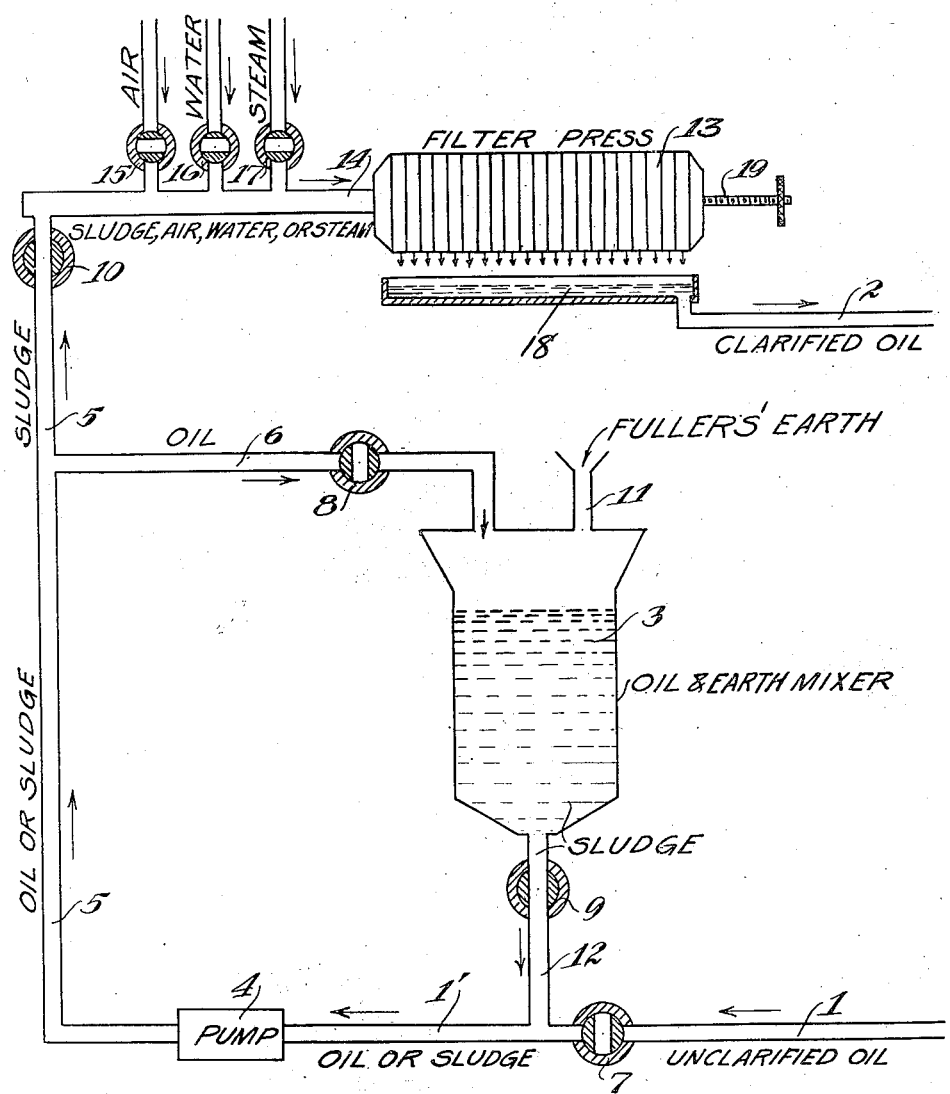

ALFRED GORDON MUNRO, OF SAN ANTONIO, TEXAS, ASSIGNOR, BY MESNE ASSIGNMENTS, TO REFINERS ENGINEERING & SUPPLY COMPANY, A CORPORATION OF ILLINOIS.

PROCESS FOR CLARIFYING OIL.

1,284,750.  Specification of Letters Patent.  Patented Nov. 12, 1918.

Application filed April 7, 1917. Serial No. 160,585.

*To all whom it may concern:*

Be it known that I, ALFRED GORDON MUNRO, a citizen of the United States of America, and a resident of San Antonio, county of Bexar, and State of Texas, have invented certain new and useful Improvements in Processes for Clarifying Oil, of which the following is a specification.

This invention relates to means and processes adapted for clarifying oil and more particularly to filtration and to means and methods for recovering the residue of oil contained in the earth on the filter member after a batch or charge of sludge composed of oil and fullers' earth has been filtered.

Heretofore it has been customary to clarify oils by treating in liquid form with fullers' earth or the like and filtering. The sludge is prepared and filtered in batches and the used earth or clay is removed periodically between batches, and disposed of as waste. When a batch of sludge is run through a filter the earth and all coloring matter and other impurities collected thereby are retained on the filter member in the form of hard mud or "cake," which has to be disposed of. This cake is normally somewhat thick and tenacious, and contains a substantial proportion of oil, which unless recovered from the cake is wasted.

In order to recover as much as possible of this residual oil, and also to render the cake more friable and easily removable from the filter cloth, it has been customary to blow air and steam through the filter press after the batch of sludge has all been filtered. This, although efficacious to some extent, fails to remove all of the oil, and as a result the process heretofore has been subject to a serious aggregate loss of oil.

Applicant has discovered that by forcing water through the filter, and particularly adding a flow of water to the air and steam treatment, the efficiency is greatly increased and a larger quantity of oil is thereby removed.

Although the use of water is found to be advantageous for whatever sequence of air, water, and steam may be used, it is preferable to follow the sequence enumerated. When thus used the air removes part of the oil; then the water removes more of the oil; and finally the steam removes whatever part of the remainder it is possible to recover and serves to dry the cake.

An illustrative embodiment of this invention is shown in the accompanying drawings, in which:

The figure is a conventional diagram showing the pipe and valve connection for the pump, mixer, filter, and receiving trough, the valves being set in the filtering position.

In the embodiment shown in the drawings, the unclarified oil is supplied from any suitable source (not shown) through the inlet pipe 1, and the clarified oil is discharged through the pipe 2 leading to any suitable receptacle (not shown). Three main steps are carried out in the process as follows:

First, a batch of sludge is prepared, for which purpose the mixing tank 3 is filled by pumping unclarified oil from its source, by means of pump 4 in the direction shown by the arrows, through the pipes, 1 1', 5 and 6, the valves 7 and 8 being open (though shown closed in the drawing). The valve 9 at the lower end of tank 3 is closed at this time, and preferably also valve 10. A suitable proportion, about 3% by weight, of fullers' earth is introduced as at 11 and mixed with the oil in the tank 3.

Second, the mixture of oil and earth or sludge is then pumped into the filter press 13 through the pipes 12, 1', 5, and 14, the valves 9 and 10 being open, and the valves 7, 8, 15, 16, and 17 being closed. The oil becomes clarified by contact with the fullers' earth, which takes up all coloring matter and other minute impurities such as could not otherwise be removed by filtration, and the earth containing the impurities is separated from the oil in the filter press, the earth being collected on suitable filters (not shown) such for instance as canvas or the like, as usual in such processes, and the clarified oil drains off and collects in a receiving trough 18, from which it is discharged through the pipe 2.

Third, after the charge of oil and earth has all been pumped from the mixer 3 into the filter press and the clarified oil has passed on, leaving the earth and impurities in the filter, there is still some oil retained in the press, being held by a capillarity in the pores of the cake. This residual oil is removed by admitting successively air, water and steam by means of the valves 15, 16, and 17 respectively, which communicate with suitable sources under requisite pressure.

After the oil and earth separation process is completed, the press is opened by releasing the screw member 19, as usual in devices of this character. The filters, bearing their solid deposits of earth and impurities, are then exposed, and the earth or cake is friable and readily crumbles and falls away and may be collected in a suitable waste receptacle (not shown) as understood in the art.

Although fullers' earth is now used very largely in filtration of many kinds of oils, including mineral, animal, and vegetable oils, its use is especially important in decolorizing certain vegetable oils, such for instance as cottonseed oil. The use of fullers' earth is very useful in the process of clarifying many of the various food oils, including lard. Applicant has found that the temperature adapted for treating cottonseed and other vegetable oils is about 215 degrees Fahrenheit varying somewhat according to the particular kind of oil. Lard is treated best at about 170 degrees temperature.

The removal of the residual oil contained in the earth cake on the filter is most efficiently accomplished by using water at about 170 degrees to 180 degrees temperature, and steam at about 70 lbs. to 110 lbs. pressure, although wide variations from this are permissible, and air at about 15 lbs. pressure, that is to say above atmospheric pressure.

In recovering the residue of oil in the filter it is preferable to turn on the air for about ten minutes which removes part of the oil. The water is then turned on for about thirty minutes, and finally the steam is turned on for about fifteen minutes. It has been found that by thus washing the filtration deposit between the applications of air and steam, the earth more readily and fully gives up the oil contained therein. After being thus treated with air, water, and steam, and the press is opened, the earth falls freely away from the filter cloth.

A particular grade of fullers' earth especially adapted for the foregoing process is known as Medina earth and is found in Bexar county, Texas.

The use of water in accordance with my discovery reduces the retention of oil in the fullers' earth by from three per cent. to fifteen per cent. varying with different earths.

Although but one specific embodiment of this invention has been herein shown and described, it will be understood that some of the details of the apparatus described may be altered or omitted without departing from the spirit of this invention as defined by the following claims.

I claim:

1. The method of separating oil from earth which consists in forcing air, water, and steam therethrough successively in the order enumerated.

2. A filter press and suitable connections therefor, adapted for treating sludge to separate oil from earth, including means for supplying sludge, air, water, and steam respectively to the press in the order enumerated, whereby the greater part of the oil may be separated from the earth by simple filtration, and the residual oil may be quickly and efficiently recovered and so saved from waste with the used earth.

3. Means for clarifying oil, comprising filtering means adapted for treating oil and earth sludge, an inlet member for said filtering means, sources of sludge, air, water, and steam, communicating with said inlet member, and valves controlling the connection with said sources respectively.

Signed at San Antonio this 30th day of March, 1917

ALFRED GORDON MUNRO.